(12) United States Patent
Yan et al.

(10) Patent No.: US 9,372,302 B2
(45) Date of Patent: Jun. 21, 2016

(54) BACKLIGHT SIMULATING DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Kai Yan, Beijing (CN); Ling Bai, Beijing (CN); Kun Lu, Beijing (CN); Zhanchang Bu, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 123 days.

(21) Appl. No.: 14/498,736

(22) Filed: Sep. 26, 2014

(65) Prior Publication Data
US 2015/0355407 A1 Dec. 10, 2015

(30) Foreign Application Priority Data
Jun. 5, 2014 (CN) .......................... 2014 1 0247829

(51) Int. Cl.
F21V 8/00 (2006.01)

(52) U.S. Cl.
CPC .............. *G02B 6/0091* (2013.01); *G02B 6/005* (2013.01); *G02B 6/0031* (2013.01); *G02B 6/0068* (2013.01); *G02B 6/0073* (2013.01); *G02B 6/0088* (2013.01)

(58) Field of Classification Search
CPC .... G02B 6/0091; G02B 6/0031; G02B 6/005; G02B 6/0068; G02B 6/0073; G02B 6/0088
See application file for complete search history.

(56) References Cited

U.S. PATENT DOCUMENTS

| 2008/0055517 A1* | 3/2008 | Yu ........................ G02B 6/0068 349/65 |
| 2008/0304288 A1* | 12/2008 | Iwasaki ................... F21V 29/02 362/632 |
| 2011/0069510 A1* | 3/2011 | Yamashita ........... G02B 6/0085 362/612 |

FOREIGN PATENT DOCUMENTS

| CN | 101776517 A | 7/2010 |
| CN | 202793745 U | 3/2013 |
| CN | 103062718 A | 4/2013 |
| JP | 2007-030438 A | 2/2007 |

OTHER PUBLICATIONS

Office Action in Chinese Patent Application No. 201410247829.1, dated Mar. 9, 2016.

* cited by examiner

*Primary Examiner* — Mary Ellen Bowman
(74) *Attorney, Agent, or Firm* — Baker Hostetler LLP

(57) ABSTRACT

The present invention provides a backlight simulating device comprising a light source simulating portion, an optical component simulating portion, a first distance measuring unit, and a second distance measuring unit. Multiple movable light-emitting members are equipped to the light source simulating portion. The optical component simulating portion is disposed adjacent to a light-emitting surface of each of the light-emitting members. The optical component simulating portion includes a light guide panel whose position can be changed relative to the light-emitting members. The first distance measuring unit acquires a distance between adjacent two of the light-emitting members. The second distance measuring unit acquires a distance between the light-emitting members and the light guide panel.

11 Claims, 3 Drawing Sheets

BACKLIGHT SIMULATING DEVICE

CROSS-REFERENCE TO RELATED APPLICATION

This application claims priority of Chinese Patent Application No. 201410247829.1, filed on Jun. 5, 2014, which is incorporated herein by reference.

TECHNICAL FIELD

The present invention relates to the field of display technology, in particular to a backlight simulating device.

BACKGROUND

Liquid crystal displays (LCD) have low working voltages, low power consumptions, flexible display modes, and low radiation. Thus, LCDs are widely utilized in various fields, such as fields related to computers, mobile phones, televisions, and measuring equipment displays. LCD includes a liquid crystal display panel and a backlight. The backlight provides a light source to the liquid crystal display panel so that the display panel is able to display images. As shown in FIG. 1 to FIG. 3, the backlight includes a back cover 10, a bezel 20, a mold frame 30, an optical sheet 40, a light guide panel (LGP) 50, a LED light bar 60, and the like. The LED light bar 60 is disposed adjacent to a light incident surface of the light guide panel 50. Lights emitted from the LED light bar 60 enter into the light guide panel 50 via the light incident surface of the light guide panel 50, reflected by a dot pattern disposed at a bottom side of the light guide panel 50 and a reflecting sheet 70, and exit from a light-exiting surface of the light guide panel 50. Then, the lights exit from the light guide panel 50 are diverged and converged by the optical sheet 40 and are exited from the optical sheet 40 as a uniform surface light source. The uniform surface light source provides a light source of the display panel 80.

Usually, the LED light bar 60 of the backlight includes multiple LEDs arranged at predetermined intervals. Each LED has a predetermined light emitting angle (120 degrees). FIG. 2 is a diagram showing a transmission of the lights. As shown in FIG. 2, in the light guide panel 50, areas in which the lights exist become bright areas, and areas to which the lights from two adjacent LED light bars 60 cannot reach become dark areas. Thus, in the areas adjacent to a light incident surface of the light guide panel 50, the bright areas and the dark areas are alternatively generated. That is, hot-spot phenomenon is generated. A generation of the hot-spot phenomenon is affected by the following factors.

First, LED pitch $d_1$: the hot-spot phenomenon is generated more easily when the distance $d_1$ between two adjacent LEDs increases.

Second, a distance $d_2$ between the LED and the light guide panel: the hot-spot phenomenon is generated more easily when the distance $d_2$ decreases.

Third, a package size $d_3$ of the LED (LED PKG): different LED packages, such as 3020 type and 7020 type, have different dimensions (3 mm, 7 mm): under the same conditions, the hot-spot phenomenon is generated more easily in the 3020 type.

Fourth, a distance $d_4$ between the LED and an effective display area (AA area) of the display panel: the hot-spot phenomenon is generated more easily when the distance $d_4$ decreases.

With an improvement in a light emitting efficiency of the LED, the number of LEDs included in the backlight decreases. When the number of LEDs decreases, the hot-spot phenomenon is more likely to be generated. Thinning of the LCD device and narrow border of the LCD device cause a decrease in the distance between the LED and the light guide panel and the distance between the LED and the effective display area of the display panel. By this reason, a LED light mixing distance is not enough, and the hot-spot phenomenon is more easily generated. Usually, before a development of a product, estimation and evaluation of the hot spots are carried out based on experience summarization and an optical simulation software. Since the optical simulation software has its own limitation, the amount of simulated lights is limited (for example, several tens of thousands of lights, several hundreds of thousands of lights). When the amount of simulated lights increase, the time required for the simulation increases (for example, simulation with the server requires 12 minutes in the case of millions of light rays). Seen from this example, the simulation using optical software has its own limitations, and the simulation result also has errors compared with a real sample. Thus, the optical simulation software has a low accuracy and requires a long time for the simulation.

SUMMARY

An object of the present invention is to provide a backlight simulating device which has a simple structure, provides an intuitive, complete and accurate optical simulation of a backlight, and substantially improves a design accuracy of a backlight.

The following will describe detailed technical solution of the present invention.

A backlight simulating device includes a light source simulating portion, an optical component simulating portion, a first distance measuring unit, and a second distance measuring unit. Multiple movable light-emitting members are equipped to the light source simulating portion. The optical component simulating portion is disposed adjacent to a light-emitting surface of each of the light-emitting members. The optical component simulating portion includes a light guide panel whose position can be changed relative to the light-emitting members. The first distance measuring unit acquires a distance between adjacent two of the light-emitting members. The second distance measuring unit acquires a distance between the light-emitting members and the light guide panel.

Further, the light-emitting members are equipped to the light source simulating portion in a detachable manner so as to replace the light-emitting members having different package sizes.

Further, the light source simulating portion includes multiple mounting structures for light-emitting-member and a rail structure. Each of the mounting structures for light-emitting-member mounts corresponding one of the light-emitting members, and each of the mounting structures for light-emitting-member includes a power supplying unit that supplies power to the corresponding one of the light-emitting members. The mounting structures for light-emitting-member are equipped to the rail structure in a movable manner.

Further, each of the mounting structures for light-emitting-member includes an insulated sliding member for connecting with the rail structure. The power supplying unit includes a first conducting portion and a second conducting portion insulated with each other and disposed, respectively, on two opposite sides of the sliding member. The first pin of the light-emitting member is electrically connected with the first conducting portion, and a second pin of the light-emitting member is electrically connected with the second conducting portion.

Further, the rail structure includes a rail and a third conducting portion and a fourth conducting portion. The third conducting portion and the fourth conducting portion are disposed, respectively, on two sides of the rail and insulated with each other by the rail. The third conducting portion conducts a positive voltage and the fourth conducting portion conducts a negative voltage. The sliding member is disposed on the rail in a movable manner. The first conducting portion disposed on one side of the sling member is contacted with the third conducting portion and electrically connected with the third conducting portion, and the second conducting portion disposed on the other side of the sliding member is contacted with the fourth conducting portion and electrically connected with the fourth conducting portion.

Further, the sliding member is provided with a locking portion that fixes the sliding member to a predetermined position of the rail.

Further, the locking portion includes a fastening bolt disposed on one end portion of the sliding member. The rail includes a through hole having a stick-like shape and the fastening bolt is disposed in the through hole. The fastening bolt moves along the through hole and drives the sliding member to move. When the fastening bolt is fastened, the sliding member is fixed to the predetermined position of the rail.

Further, the first distance measuring unit has a first measuring ruler that measures the distance between adjacent two of the light-emitting members. The second distance measuring unit has a second measuring ruler that measures the distance between the light-emitting members and the light guide panel.

Further, each of the light-emitting members is a packaged LED.

Further, the optical component simulating portion further includes an optical film disposed adjacent to a light-exiting surface of the light guide panel, a bottom reflection sheet disposed adjacent to a surface of the light guide panel which is apart from the light-exiting surface, and a display panel disposed on one side of the optical film, the one side of the optical film being apart from the light guide panel.

Further, the backlight simulating device further includes a third distance measuring unit for acquiring a distance between the light-emitting members and an effective display area of the display panel.

The present invention provides the following advantages.

In the backlight simulating device provided by the present invention, the distance between two adjacent light-emitting members and the distance between the light guide panel and the light-emitting members are adjustable. The first distance measuring unit acquires the distance between the adjacent two light-emitting members, and the second distance measuring unit acquires the distance between the light-emitting members and the light guide panel. Thus, the backlight simulating device is able to quantitatively control main factors that affect a backlight to generate hot-spot phenomenon, and is able to actually simulate optical effect of a backlight product to be developed. The backlight simulating device provided by the present invention accurately simulates a state of hot spots, quantitatively evaluates a state in which hot-spot phenomenon is able to be avoided by changing above parameters, provides a base of an accurate design, improves simulation accuracy and product simulation design efficiency, and reduces a time required for development.

In a preferred technical solution of the present invention, the light-emitting members can changed to other light-emitting members that have different package sizes and the distance between the light-emitting member and the effective area of the display panel is measured in order to quantitatively control other factors that cause a generation of the hot-spot phenomenon and further improve simulation accuracy.

DETAILED DESCRIPTION

To make the objects, the technical solutions and the advantages of the present invention more apparent, the following will describe embodiments of the present disclosure with reference to accompanying drawings. The embodiments described below are only used for interpreting the present invention, but not for limiting a scope of the present invention.

According to a prior art, before a development of a product, an estimation and a evaluation of the hot-spot phenomenon are carried out based on experience summarization and an optical simulation software. Thus, accuracy of the simulation is low and a time required for the simulation is long. The present invention provides a backlight simulating device which has a simple structure, improves simulation accuracy, improves simulation design efficiency of a product, and reduces a time required for the development.

Figure 1:
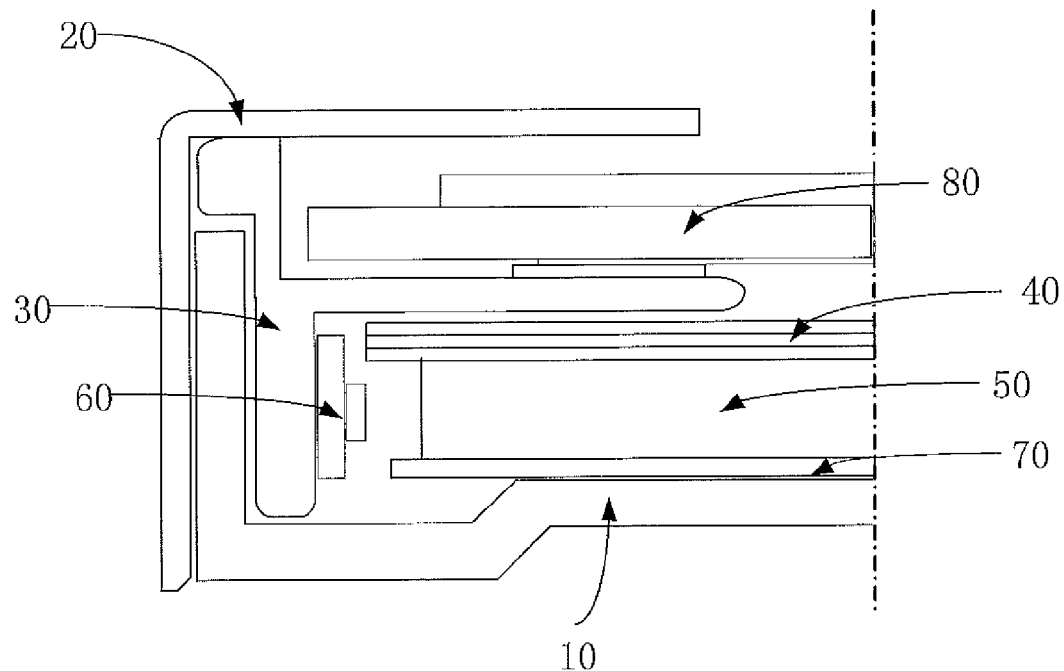
FIG. 1 is a diagram showing a configuration of a backlight according to a related art.
Figure 2:
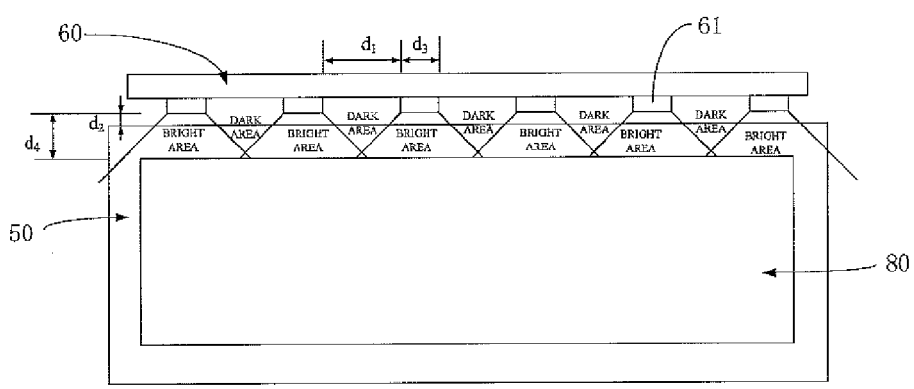
FIG. 2 is a diagram showing a hot-spot phenomenon generated by the backlight.
Figure 3:
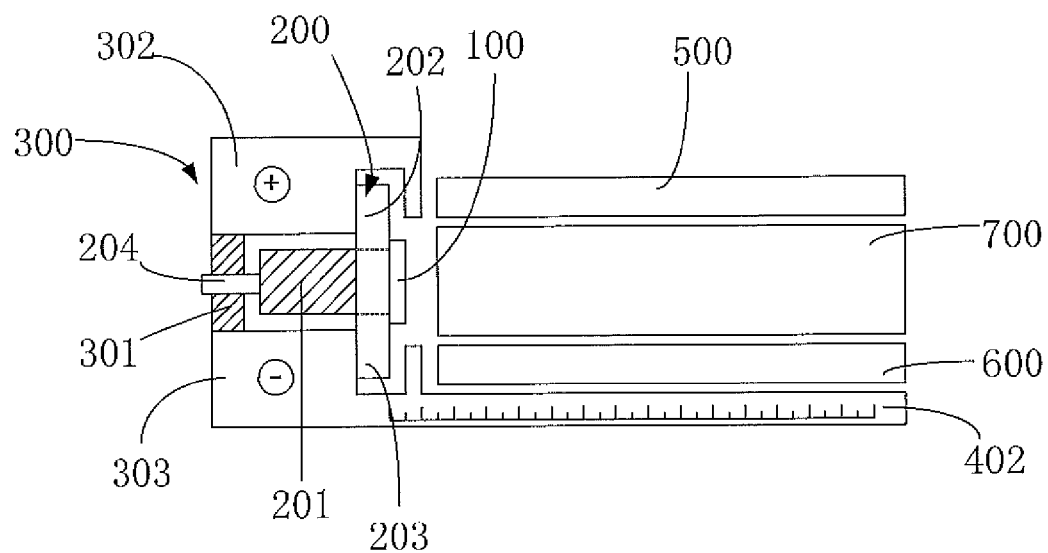
FIG. 3 is a diagram showing a cross-sectional view of a backlight simulating device according to an embodiment of the present invention.
Figure 4:
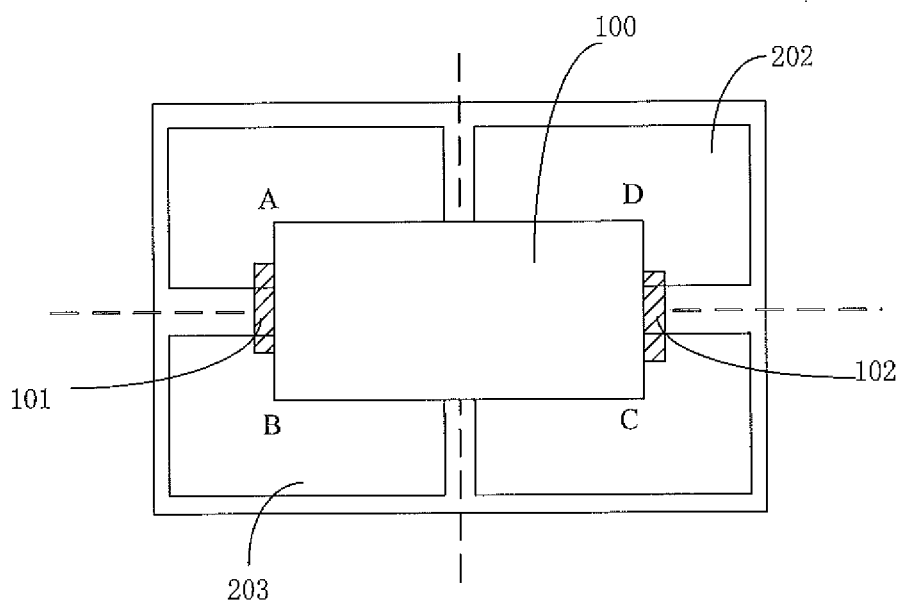
FIG. 4 is a diagram showing a configuration of a mounting structure included in a backlight simulating device according to an embodiment of the present invention.
Figure 5:
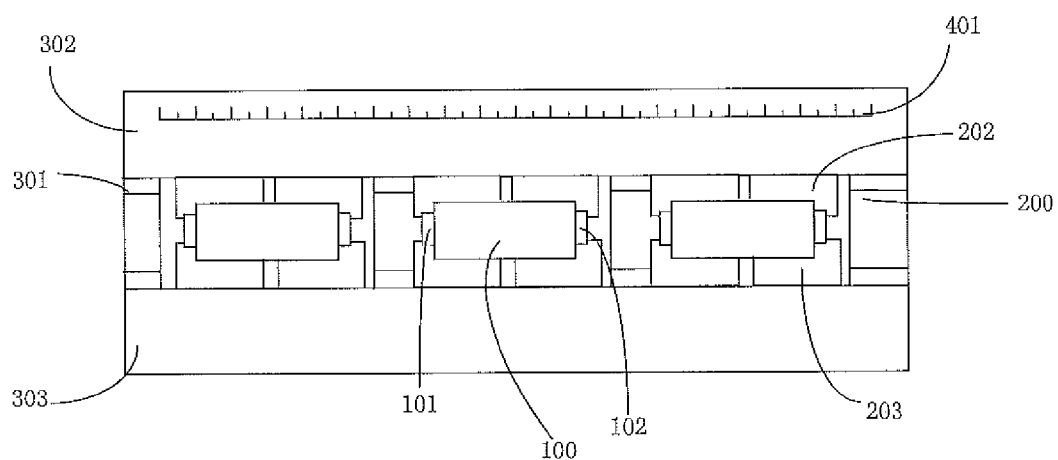
FIG. 5 is a diagram showing a configuration of a light source simulating portion included in a backlight simulating device according to an embodiment of the present invention.

As shown in FIG. 3 to FIG. 5, the present invention provides a backlight simulating device, which includes a light source simulating portion, an optical component simulating portion, a first distance measuring unit, and a second distance measuring unit. Multiple movable light-emitting members 100 are equipped to the light source simulating portion. The optical component simulating portion is disposed adjacent to a light-emitting surface of each of the light-emitting members 100. The optical component simulating portion includes a light guide panel 700 whose position can be changed relative to the light-emitting members 100. The first distance measuring unit acquires a distance between adjacent two of the light-emitting members 100. The second distance measuring unit acquires a distance between the light-emitting members 100 and the light guide panel 700.

The backlight simulating device provided by an embodiment of the present invention mainly includes the light source simulating portion that simulates a light source of the backlight and the optical component simulating portion that simulates other optical film component of the backlight. Each of the multiple light-emitting members 100 included in the light source simulating portion is configured to be movable in order to change the distance between two adjacent light-emitting members 100. In the optical component simulating portion, the distance between the light guide panel 700 and the light-emitting member 100 is configured to be changeable in order to change the distance between the light-emitting member 100 and the light guide panel 700. The distance between two adjacent light-emitting members 100 and the distance between the light-emitting member 100 and the light guide panel 700 are acquirable as distance parameters by the first distance measuring unit and the second distance measuring unit, respectively. Thus, the main factors that affect a generation of the hot-spot phenomenon can be quantitatively controlled. Thus, an optical effect of a product to be developed can be actually simulated, and a generation state of the hot-spot phenomenon can be simulated accurately. Further, a state in which hot spots are able to be avoided by changing above parameters can be quantitatively evaluated, a base of an accurate design is provided, simulation accuracy and product simulation design efficiency are improved, and a time required for development is reduced.

The following will describe a method for simulating a real backlight using the backlight simulating device according to an embodiment of the present invention.

The light-emitting members 100 are moved to adjust the distance between two adjacent light-emitting members 100.

The light guide panel 700 or the light-emitting member 100 is moved to adjust a distance between the light-emitting member 100 and the light guide panel 700.

After the above-described adjusting steps, the light-emitting members 100 are turned on. When the image displayed on the optical component simulating portion does not reach a required standard, that is the hot-spot phenomenon is generated, and adjusting of the distance between two adjacent light-emitting members 100 and the distance between the light-emitting members 100 and the light guide panel 700 is carried by repeatedly carrying out above-described adjusting steps until the image displayed on the optical component simulating portion reaches the required standard. With this method, the simulation of the backlight is completed. Then, the distance between the two adjacent light-emitting members 100 and the distance between the light-emitting members 100 and the light guide panel 700 are acquired as distance parameters by the first distance measuring unit and the second distance measuring unit, respectively. The distance parameters are used as the development design parameters of a backlight product.

The following will describe a preferred embodiment of the backlight simulation device according to the present invention.

In the present embodiment, the light-emitting members 100 are equipped to the light source simulating portion in a detachable mariner so as to replace the light-emitting members 100 having different package sizes. With this configuration, light-emitting members 100 having different package sizes can be used. Thus, the package sizes of the light-emitting member 100 which affects the generation of the hot-spot phenomenon by the backlight can be controlled, and simulation accuracy can be improved. Preferably, the light-emitting member 100 is a packaged LED (LED PKG).

In the present embodiment, preferably, as shown in FIG. 3 and FIG. 5, the light source simulating portion includes multiple mounting structures for light-emitting-member 200 and a rail structure 300. Each of the mounting structures for light-emitting-member 200 mounts corresponding one of the light-emitting members 100, and each of the mounting structures for light-emitting-member 200 includes a power supplying unit that supplies power to the corresponding one of the light-emitting members 100. The mounting structures for light-emitting-member 200 are equipped to the rail structure 300 in a movable manner.

In the above configuration, in the light source simulating portion, each of the light-emitting members 100 is equipped to the rail structure 300 by the mounting structure for light-emitting-member 200. The mounting structure for light-emitting-member 200 moves along the rail structure 300, and drives the light-emitting member 100 to move. Thus, the distance between the two adjacent light-emitting members 100 can be changed by a simple movement mode. In an actual application, the light-emitting members 100 may be moved by other configurations which are not described here.

In the present embodiment, preferably, as shown in FIG. 3 and FIG. 5, each of the mounting structures for light-emitting-member 200 includes an insulated sliding member 201 for connecting the mounting structure 200 with the rail structure 300. The power supplying unit includes a first conducting portion 202 and a second conducting portion 203 insulated with each other and disposed, respectively, on two opposite sides of the sliding member 201. The first pin 101 of the light-emitting member 100 is electrically connected with the first conducting portion 202, and a second pin 102 of the light-emitting member 100 is electrically connected with the second conducting portion 203.

In the above configuration, the sliding member 201 is used for connecting the mounting structure 200 with the rail structure 300. The light-emitting members 100 are equipped to the sliding member 201 in a detachable manner. The two pins of the light-emitting member 100 are electrically connected with the first conducting portion 202 and the second conducting portion 203 of the sliding member, respectively, and a mounting of the light-emitting members 100 is achieved by this configuration.

In the present embodiment, preferably, as shown in FIG. 3 and FIG. 5, the rail structure 300 includes a rail 301, a third conducting portion 302, and a fourth conducting portion 303. The third conducting portion 302 and the fourth conducting portion 303 are disposed, respectively, on two sides of the rail 301 and insulated with each other by the rail 301. The third conducting portion 302 conducts a positive voltage and the fourth conducting portion 303 conducts a negative voltage. The sliding member 201 is disposed on the rail 301 in a movable manner. The first conducting portion 202 disposed on one side of the sling member 201 contacts with the third conducting portion 302 and is electrically connected with the third conducting portion 302, and the second conducting portion 203 disposed on the other side of the sliding member 201 contacts with the fourth conducting portion 303 and is electrically connected with the fourth conducting portion 303.

In the above configuration, on both upper and lower sides of the rail of the rail structure 300, the conducting portions, that is, the third conducting portion 302 and the fourth conducting portion 303 are disposed. The rail 301 insulates the third conducting portion 302 from the fourth conducting portion 303. The third conducting portion 302 conducts the positive voltage, and the fourth conducting portion 303 conducts the negative voltage. The third conducting portion 302 and the fourth conducting portion 303 are, respectively, disposed on the upper and lower side of the rail, the sliding member 201 is disposed on the rail, and the first conducting portion 202 and the second conducting portion 203 are, respectively, disposed on the upper and lower sides of the sliding member 201. Thus, the first conducting portion 202 fixed to the sliding member 201 contacts with the third conducting portion 302 disposed on the same side, and an electrical connection between the first conducting portion 202 and the third conducting portion 302 can be achieved. The second conducting portion 203 contacts with the fourth conducting portion 303 disposed on the same side, and an electrical connection between the second conducting portion 203 and the fourth conducting portion 303 disposed on the same side can be achieved. This configuration enables a power supply to the light-emitting member 100.

Further, with above configuration, the third conducting portion 302 and the fourth conducting portion 303 are, respectively, disposed on the upper and lower sides of the rail 301, and the first conducting portion 202 and the second conducting portion 203 are, respectively, disposed on the upper and lower sides of the sliding member 201. When the sliding member 201 moves along the rail 301, the first conducting portion 202 can maintain a contact with the third conducting portion 302 disposed on the same side and the second conducting portion 203 can maintain a contact with the fourth conducting portion 303 disposed on the same side. The electrical connection by this kind of contact has a simple structure, and does not need any cables or electrical circuits. Thus, in the configuration according to the present embodiment, a movement of the light-emitting member 100 is not limited by the cables or the electrical circuits.

In an actual application, a method of supplying power to the light-emitting members 100 is not limited to the above-described configuration. The power supply can be carried by different methods. For example, the rail structure 300 is provided by an insulator, an electrical circuit for supplying power to the light-emitting member 100 can be equipped to the sliding member 201 or the like. Herein, the examples are not described in details.

The following will describe a preferred embodiment of the mounting structure 200.

As shown in FIG. 4 and FIG. 5, the light-emitting member 100 is preferably a packaged LED (LED PKG). Usually, two pins of the LED PKG are disposed on two opposite sides. In the present embodiment, the power supplying unit of the mounting structure 200 is disposed on one end of the sliding member 201 (the end adjacent to the light guide panel 700). According to a structure characteristic of the LED PKG, preferably, a first end of the sliding member 201 is divided into four separated areas that are arranged in arrays. The four areas include a first area A, a second area B, a third area C, and a fourth area D. The first area A is arranged diagonally with the third area C, and the second area B is arranged diagonally with the fourth area D. The second area B and the fourth area D are provided by conducting members as the first conducting portion 202 and the second conducting portion 203. The first area A and the third area C are provided by insulated members. The two soldering pins of the LED PKG are, respectively, fixed to an intermediate portion of the first area A and the second area B, and an intermediate portion of the third area C and the fourth area D. The sliding member 201 is disposed at an inside portion of the rail 301. The second area B and the fourth area D are, respectively, contacted with the third conducting portion 302 and the fourth conducting portion 303 disposed, respectively, on the upper and the lower sides of the rail 301. The positive voltage is provided to the third conducting portion 302 disposed on the upper side of the rail 301. The negative voltage is provided to the fourth conducting portion 303 disposed on the lower side of the rail 301. Thus, the second area B conducts the positive voltage and the fourth area D conducts the negative voltage. Thus, a turning of the LED is achieved.

The above-described embodiment is a preferred embodiment of the mounting structure 200. In an actual application, the mounting structure may have different configurations, which are not described herein in details.

In the present embodiment, preferably, the sliding member 201 is provided with a locking portion that fixes the sliding member 201 to a predetermined position of the rail 301. With this configuration, the locking portion is able to lock the sliding member 201 at the predetermined position of the rail 301. Thus, an abnormal movement of the light-emitting member 100 can be avoided during the simulation.

In the present embodiment, further preferably, as shown in FIG. 3, the locking portion includes a fastening bolt 204 disposed on a second end (opposite to the above-described first end) of the sliding member 201. The rail 301 includes a through hole having a stick-like shape and the fastening bolt 204 is disposed in the through hole. The fastening bolt 204 moves along the through hole and drives the sliding member 201 to move. When the fastening bolt 204 is fastened, the sliding member 201 is fixed to the predetermined position of the rail 301.

In the above configuration, the fastening bolt 204 cooperates with the rail 301, and drives the sliding member 201 to move. Further, the fastening bolt 204 is able to lock the sliding member 201 on the predetermined position of the rail 301 in order to avoid an abnormal sliding of the light-emitting member 100.

In an actual application, the locking portion may have different configurations, which are not described herein in details. Further, an attaching of the sliding member to the rail is not limited to the above-described configuration. Descriptions of different examples are omitted herein.

In the present embodiment, preferably as shown in FIG. 3 and FIG. 5, the first distance measuring unit has a first measuring ruler 401 that measures the distance between adjacent two of the light-emitting members 100. The second distance measuring unit has a second measuring ruler 402 that measures the distance between the light-emitting members 100 and the light guide panel 700.

With this configuration, the structure parameters of the backlight can be acquired directly by the measuring rulers. Thus, additional measuring tools are not necessary, and this enables a simple measuring. In an actual application, other measuring tools may be used to acquire the above-described parameters. For example, infrared distance measuring instrument may be used. Descriptions of different examples are omitted herein.

In the present embodiment, as shown in FIG. 5, the first measuring ruler 401 is disposed on the third conducting portion 302. Thus, the structure is simple and a direct measuring can be carried out.

In the present embodiment, in order to further improve the simulation accuracy, preferably, the optical component simulating portion further includes an optical film 500 disposed adjacent to a light-exiting surface of the light guide panel 700, a bottom reflection sheet 600 disposed adjacent to a surface of the light guide panel 700 which is apart from the light-exiting surface, and a display panel (not shown in the drawing) disposed on one side of the optical film 500, the one side of the optical film 500 being apart from the light guide panel 700.

With this configuration, the bottom reflection sheet and optical sheet included in a conventional backlight are included in the optical component simulating portion. Thus, the simulation of the backlight can be carried out more accurately. In the above configuration, the display panel is included in the optical component simulating portion. Thus, the simulation of an optical effect of the backlight to be developed to the display panel can be carried out more directly and actually.

In the present embodiment, preferably, the backlight simulating device further includes a third distance measuring unit for acquiring a distance between the light-emitting members 100 and an effective display area of the display panel.

The main factors that affect the generation of the hot-spot phenomenon include the distance between the light-emitting members 100 and the effective display area of the display panel. With this configuration, backlight simulating device according to the present embodiment is able to quantitatively control the main factors that affect the backlight to generate the hot-spot phenomenon. Thus, simulation accuracy and product simulation design efficiency are further improved, and the time required for the development is reduced.

The third distance measuring unit may be provided by a measuring ruler or other measuring tools.

In the backlight simulating device provided by the embodiments of the present invention, the materials of the light guide panel 700, the optical film 500, and the bottom reflection sheet 600 of the optical component simulating portion can be changeable in order to select better optical film to simulate the backlight to be developed.

It should be noted that the present invention is not limited the above preferred embodiments and modifications thereof. That is, the above embodiments and modifications thereof may be modified by a person skilled in the art in various ways without departing from the sprit and scope of the present invention.

What is claimed is:

1. An backlight simulating device, comprising:
   a light source simulating portion to which a plurality of movable light-emitting members are equipped;
   an optical component simulating portion disposed adjacent to a light-emitting surface of each of the light-emitting members, the optical component simulating portion comprising a light guide panel whose position can be changed relative to the light-emitting members;
   a first distance measuring unit for acquiring a distance between adjacent two of the light-emitting members; and
   a second distance measuring unit for acquiring a distance between the light-emitting members and the light guide panel.

2. The backlight simulating device according to claim 1, wherein
   the light-emitting members are equipped to the light source simulating portion in a detachable manner so as to replace the light-emitting members having different package sizes.

3. The backlight simulating device according to claim 1, wherein
   the light source simulating portion comprises:
   a plurality of mounting structures for light-emitting-member, each of the mounting structures for light-emitting-member mounting corresponding one of the light-emitting members, each of the mounting structures for light-emitting-member comprising a power supplying unit that supplies power to the corresponding one of the light-emitting members; and
   a rail structure to which the mounting structures for light-emitting-member are equipped in a movable manner.

4. The backlight simulating device according to claim 3, wherein
   each of the mounting structures for light-emitting-member comprises an insulated sliding member for connecting with the rail structure,
   the power supplying unit comprises:
   a first conducting portion and a second conducting portion insulated with each other and disposed, respectively, on two opposite sides of the sliding member, and
   a first pin of the light-emitting member is electrically connected with the first conducting portion, and a second pin of the light-emitting member is electrically connected with the second conducting portion.

5. The backlight simulating device according to claim 4, wherein
   the rail structure comprises:
   a rail; and
   a third conducting portion and a fourth conducting portion disposed, respectively, on two sides of the rail and insulated with each other by the rail, the third conducting portion conducting a positive voltage and the fourth conducting portion conducting a negative voltage, and
   wherein the sliding member is disposed on the rail in a movable manner, the first conducting portion disposed on one side of the sliding member is contacted with the third conducting portion and electrically connected with the third conducting portion, and the second conducting portion disposed on the other side of the sliding member is contacted with the fourth conducting portion and electrically connected with the fourth conducting portion.

6. The backlight simulating device according to claim 5, wherein
   the sliding member is provided with a locking portion that fixes the sliding member to a predetermined position of the rail.

7. The backlight simulating device according to claim 6, wherein
   the locking portion comprises a fastening bolt disposed on one end portion of the sliding member,
   the rail comprises a through hole having a stick-like shape,
   the fastening bolt is disposed in the through hole,
   the fastening bolt moves along the through hole and drives the sliding member to move, and
   when the fastening bolt is fastened, the sliding member is fixed to the predetermined position of the rail.

8. The backlight simulating device according to claim 1, wherein
   the first distance measuring unit has a first measuring ruler that measures the distance between adjacent two of the light-emitting members, and
   the second distance measuring unit has a second measuring ruler that measures the distance between the light-emitting members and the light guide panel.

9. The backlight simulating device according to claim 1, wherein
   each of the light-emitting members is a packaged LED.

10. The backlight simulating device according to claim 1, wherein
    the optical component simulating portion further comprises
    an optical film disposed adjacent to a light-exiting surface of the light guide panel;
    a bottom reflection sheet disposed adjacent to a surface of the light guide panel which is apart from the light-exiting surface; and
    a display panel disposed on one side of the optical film, the one side of the optical film being apart from the light guide panel.

11. The backlight simulating device according to claim 10, further comprising:
    a third distance measuring unit for acquiring a distance between the light-emitting members and an effective display area of the display panel.

* * * * *